(12) United States Patent
Shiozaki et al.

(10) Patent No.: US 6,781,634 B1
(45) Date of Patent: Aug. 24, 2004

(54) ELECTRONIC CAMERA

(75) Inventors: Toshikatsu Shiozaki, Akiruno (JP); Hiroki Onda, Hachioji (JP); Takashi Inoue, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/149,006

(22) Filed: Sep. 8, 1998

(30) Foreign Application Priority Data

Sep. 9, 1997 (JP) .............................................. 9-259412

(51) Int. Cl.[7] ........................ H04N 5/225; H04N 5/222
(52) U.S. Cl. ........................ 348/374; 348/371; 348/373
(58) Field of Search .............................. 348/207.99, 371, 348/373, 374, 375; 396/176, 177, 205, 539, 529; D16/202

(56) References Cited

U.S. PATENT DOCUMENTS

| | | | | |
|---|---|---|---|---|
| 5,036,343 A | * | 7/1991 | Yamanaka | 348/373 |
| 5,079,584 A | * | 1/1992 | Nakamura | 396/539 |
| 5,388,907 A | * | 2/1995 | Aoyama et al. | 374/130 |
| 5,565,941 A | * | 10/1996 | Kaneko | 396/177 |
| 5,729,289 A | * | 3/1998 | Etoh | 348/373 |
| D397,707 S | * | 9/1998 | Naitou | D16/202 |
| 5,852,752 A | * | 12/1998 | Nakanishi et al. | 396/176 |
| 5,978,603 A | * | 11/1999 | Shiozaki et al. | 396/177 |
| 6,188,432 B1 | * | 2/2001 | Ejima | 348/374 |

FOREIGN PATENT DOCUMENTS

JP          02-302741      * 12/1990    ........... G03B/15/05

* cited by examiner

*Primary Examiner*—Wendy R. Garber
*Assistant Examiner*—Luong T. Nguyen
(74) *Attorney, Agent, or Firm*—Pillsbury Winthrop LLP

(57) ABSTRACT

A beam splitter splits a light beam having passed through an image pick-up device into a plurality of split light beams. An image pick-up device converts one of the split light beams emitted from the beam splitter to an electric signal. An optical viewfinder uses another one of the split light beams emitted from the beam splitter for visually recognizing an image. The eyepiece of the optical viewfinder is disposed on an upper part of the rear surface of the camera body adjacent the left end thereof.

6 Claims, 11 Drawing Sheets

ELECTRONIC CAMERA

BACKGROUND OF THE INVENTION

The present invention relates to electronic cameras generally called digital cameras for electronically recording images picked up by an image pick-up device on a recording medium and, more particularly, to improvements in constructions and dispositions of components of such electronic cameras.

Heretofore, in electronic cameras as well as silver film cameras, covers and internal components are assembled and held in various ways, which are roughly classified into the following two types. In a first type, substantially all the internal components are assembled in single molded or rolled frame to form a unit, and two, i.e., front and rear, cover parts are fitted on the unit for protection thereof (this type being referred to as frame type). In a second type, the cover does not only serve as a mere protective cover, but it also has the role of a frame for supporting the internal components. More specifically, the cover is not a thin shell-like part but has a member for assembling and securing internal components thereto. The internal components are assembled to the cover itself (this type being referred to as cover type).

In the meantime, usual single-lens reflex electronic camera adopts internal layout, which considerably resemble those of silver film cameras of the same single-lens reflex type. More specifically, a movable mirror is used to split the incident light flux to split light fluxes and supplies them to an image pick-up device and a viewfinder. A penta-prism is provided at intermediate to the viewfinder. The eyepiece of the viewfinder is provided substantially at the center of the camera in the long dimension direction thereof. Also, instead of a film an image pick-up surface of the image pick-up device extends perpendicular to the image pick-up optical axis. The camera is used with a power supply battery, which is disposed such that it extends parallel with the film patrone, i.e., perpendicular to the camera body bottom.

In the electronic camera, unlike the conventional silver film camera, it is necessary, in addition to operation checks of various components, to make overall adjustment of the brightness of picked-up image, colors thereof and so forth after the photographing lens, image pick-up device, electric circuit board and other components have been assembled. This means that it is necessary that final confirmation of functions and overall adjustment can be made without fitting the cover. Otherwise, the assembling property is extremely deteriorated.

Regarding this demand, in the frame type the final confirmation of functions and overall adjustment can be made well after forming the unit by assembling the internal components in the single frame and before fitting the cover on the unit. In the second type, however, the components are assembled and mounted in either one of a plurality of cover parts, and some components are conceived by the cover, although this may depend on the shape of the cover. In such a case, it is considerably difficult to make final function confirmation and overall adjustment after the component have been assembled and mounted in the cover. Even if such confirmation and adjustment could be made, great care would be necessary in the adjustment of the component parts assembled in the cover to maintain the appearance of the cover without any damage thereto. Such care deteriorates the assembling property. Therefore, this cover type is unsuited for the electronic camera which has an electronic image pick-up system, although it poses no problem with the silver salt film camera.

In the meantime, there is a strong demand for size reduction of electronic cameras or like portable units. In view of this demand, the frame type is disadvantageous in that the framework structure that is formed by the frame member leads to a volume increase. So far as the size reduction demand is concerned, the cover type is advantageous in that no exclusive frame is unnecessary. However, as described before, the cover type is disadvantageous from the standpoint of the final function confirmation and overall adjustment. In the long run, neither type can meet the two demands for the electronic camera, i.e., readiness of final function confirmation and overall adjustment and size reduction.

Regarding the internal layout of the camera, the electronic camera tends to have a greater volume than the silver film camera because of the presence of the image pick-up device and a processing system therefor. Particularly, since the electric circuit board obviously has a large area, the volume of the electronic camera would be greater without doubt than the silver film camera when the same component layout as therefor is adopted, deteriorating the portability and convenience of handling.

Specifically, there is a trend for increasing depth or thickness of camera. That is, in the electronic camera, an image monitor display (for instance an LCD display) which is often mounted on the camera body in order to provide utmost simultaneous character, is provided together with the viewfinder eyepiece on the rear surface of the camera. With the provision of the image monitor display on the rear surface of the camera, the depth or thickness of the camera is increased in correspondence to the thickness of the LCD of the display. This may result in inconvenience of holding the camera or deterioration of the sense of griping the camera in the photography, which may cause swinging of the camera.

In a further aspect, a penta-prism which is usually used in the single-lens reflex electronic camera, is a factor of increasing the height of the camera. By purely replacing the penta-prism with a mirror system or the like for reducing the camera height, however, the camera depth or thickness is increased in corresponding to the length of the optical path.

As shown above, in the electronic camera it is necessary, in addition to reduce the volume or the camera, to provide adequate balance of the width, depth and height dimensions. In this respect, no substantial considerations have been paid.

SUMMARY OF THE INVENTION

The present invention seeks to solve the above problems inherent in the prior art electronic camera, and it has an object of providing a electronic camera, which is reduced in size, convenient to handle, permits ready final function confirmation and overall adjustment, and has excellent assembling property.

Specifically, an object of the present invention is to provides an electronic camera which permits effective utilization an upper space in the camera body, permits reduction of the depth or thickness of the camera body.

Another object of the present invention is to provides an electronic camera which is free from blocking of strobo light by any camera part and has a strobo light emission part such as to permit effective utilization of the dead pace.

Another object of the present invention is to provides an electronic camera which provides stable state of support utilizing the bottom surface of the camera body and permits effective utilization of the inner space of the camera body adjacent the bottom thereof.

Other object of the present invention is to provides an electronic camera which ensures stability of photographing and can effectively prevent swinging of the camera.

Still other object of the present invention is to provides an electronic camera which permits reduction of the depth or thickness of the camera body.

Further object of the present invention is to provides an electronic camera which internally has a main capacitor for strobo and a battery for camera power supply and permits reduction of the height of the camera body.

Still further object of the present invention is to provides an electronic camera which can hold the main capacitor for strobo with sufficient space efficiency and in a stable state.

Other object of the present invention is to provides an electronic camera which readily permits size reduction of internal components.

Still other object of the present invention is to provides an electronic camera which improves efficiency of mounting electric circuit boards and permits a camera frame to a cover without generation of strain.

According to a first aspect of the present invention, there is provided an electronic camera comprising a beam splitter for splitting a light beam having passed through an image pick-up device into a plurality of split light beams, an image pick-up device for converting one of the split light beams emitted from the beam splitter to an electric signal, and an optical viewfinder for using another one of the split light beams emitted from the beam splitter for visually recognizing an image, the eyepiece of the optical viewfinder being disposed on an upper part of the rear surface of the camera body adjacent the left end thereof.

In the electronic camera having the above construction, the viewfinder optical path is bent to the left end. Thus, unlike the case where the viewfinder is disposed on the center of the top or rear surface of the camera body, the upper space in the camera body is not divided by the optical viewfinder. It is thus possible to make effective use of the upper space for disposing electric circuit boards or the like. Thus, it is possible to reduce the depth or thickness of the camera body, compared to the case where the viewfinder eyepiece is disposed at the center of the camera body top or rear surface. By disposing the photographing lens at the left end of the camera body, it is no longer necessary to bend the viewfinder optical path at an intermediate position, but doing so gives rise to the problem of deteriorating the weight balance.

According to a second aspect of the present invention, there is provided an electronic camera comprising a camera body having a grip to be gripped by a gripping hand, a substantially cylindrical projection projecting from the camera body along a photographing axis and accommodating a photographing optical system, and an image pick-up device for converting an image signal obtained through a photographing optical system to an electrical signal, wherein as pivotally erectable strobo is provided on top of the projection.

With the strobo light emitting part thus provided on top of the projection, which projects from the camera body and has an internal image pick-up optical system, unlike the case where the strobo light emitting part is disposed on the camera body, in strobo photographing the strobo light is not blocked by the cover part of the photographing optical system, i.e., the projection. It is thus possible to effectively utilize the dead space.

According to a third aspect of the present invention, there is provided the electronic camera according to the second aspect, wherein the bottom surface of the projection partly has a flat surface flush with a flat part of the bottom surface of the camera body.

With the bottom surface of the projection having a flat surface flush with a flat part of the bottom surface of the camera body, the inner space of the camera body adjacent the bottom thereof is increased, thus permitting a large trapezoidal electric circuit board to be disposed inside the bottom of the camera body. In addition, by utilizing the bottom of the camera body as support, which has an increased flat part area, it is possible to improve the stability.

According to a fourth aspect of the present invention, there is provided the electronic camera according to one of the second or third aspect, wherein the projection has recesses formed such that they extend in the longitudinal direction of the projection and correspond in position to fingers of the gripping hand gripping the projection.

With the camera body having the projection, in which the image pick-up lens is provided, from there gravity relation it is necessary to hold the projection with the gripping hand. According to the fourth aspect, the recesses formed on opposite sides of the projection along the longitudinal direction thereof, it is possible to stabilize the state of the camera in photographing and present swinging.

According to a fifth aspect of the present invention, there is provided an electronic camera comprising a beam splitter for splitting a light beam having passed through an image pick-up device into a plurality of split light beams, an image pick-up device for converting one of the split light beams emitted from the beam splitter to an electric signal, and an optical viewfinder for using another one of the split light beams emitted from the beam splitter for visually recognizing an image, wherein the image pick-up device has an image pick-up surface at an angle other than right angles to the optical axis of the photographing lens.

With the image pick-up surface disposed at an angle other than right angles to the optical axis of the photographing lens, it is possible to reduce the depth or thickness of the camera body in correspondence to the thickness of the image pick-up device.

According to a sixth aspect of the present invention, there is provided an electronic camera comprising an image pick-up device for converting an image obtained via a photographing optical system to an electric signal, a strobo and a camera body accommodating an elongate battery as camera power supply disposed to be substantially parallel to the rear and bottom surfaces of the camera body, wherein an elongate main capacitor for the strobo is disposed such that its longitudinal direction is substantially parallel to the long side dimension of the battery.

Since the main capacitor for the strobo has an elongate shape similar to the battery as the camera power supply, it is possible to reduce the height of the camera body by disposing the main capacitor such as to be substantially parallel to the battery and extend in the width direction of the camera body.

According to a seventh aspect of the present invention, there is provided the electronic camera according to the sixth aspect, wherein the outer surface of a battery accommodating part for accommodating and holding the battery is formed with a main capacitor support part.

With the main capacitor held on the support formed on the outer surface of the battery accommodating part, unlike the usual case where the main capacitor is connected in a cantilever form to the electric circuit board, the capacitor can be held stably and can be prevented, with a simple structure, from being detached with breakage of lead lines due to such cause as vibration and shocks. In addition, since the main capacitor is similar in shape to the battery, it suits the battery accommodating part well, and the battery accommodating part suits the main capacitor support. It is thus possible to ensure satisfactory space efficiency. Furthermore, since the battery accommodating part utilizes a usual outer wall, it is possible to reduce cost.

According to an eighth aspect of the present invention, there is provided an electronic camera comprising a battery accommodating part for accommodating and holding a battery as a camera power supply, a cylindrical member accommodating a photographing lens, a beam splitter, and an image pick-up device.viewfinder assembly optical components of an optical viewfinder and an image pick-up device, wherein the battery accommodating part, the cylindrical member and the image pick-up device.viewfinder assembly are combined together to form a hybrid camera frame.

Since the three components are coupled together to form the hybrid camera frame for dispensing with an exclusive frame, it is possible to reduce the size of the internal component unit. In addition, by dispensing with an exclusive frame, it is possible to reduce cost and save space.

According to a ninth aspect of the present invention, there is provided the electronic camera according to the eighth aspect, wherein a cover accommodates and protects the hybrid camera frame, an electric circuit board being disposed between the hybrid camera frame and the inner surface of the cover.

Since he inner surface of the cover is substantially flat and also the electric circuit board is also substantially flat, it is possible to readily dispose the electric circuit board between the inner cover surface and the hybrid camera frame and improve the mounting efficiency.

According to a tenth aspect of the present invention, there is provided the electronic camera according to the ninth aspect, wherein the cover includes a plurality of cover parts, the hybrid camera frame being secured to one of the cover parts.

If the hybrid camera frame is coupled to a plurality of cover parts, it is possible that strain is generated due to relative dimensional errors to generate stress in the hybrid camera frame. With the hybrid camera frame coupled to only a single cover part, it is possible to reduce strain in the hybrid camera frame to relative dimensional errors and reduce deviations after the assembling.

Other objects and features will be clarified from the following description with reference to attached drawings.

PREFERRED EMBODIMENTS OF THE INVENTION

Preferred embodiments of the present invention will now be described with reference to the drawings.

Figure 1:
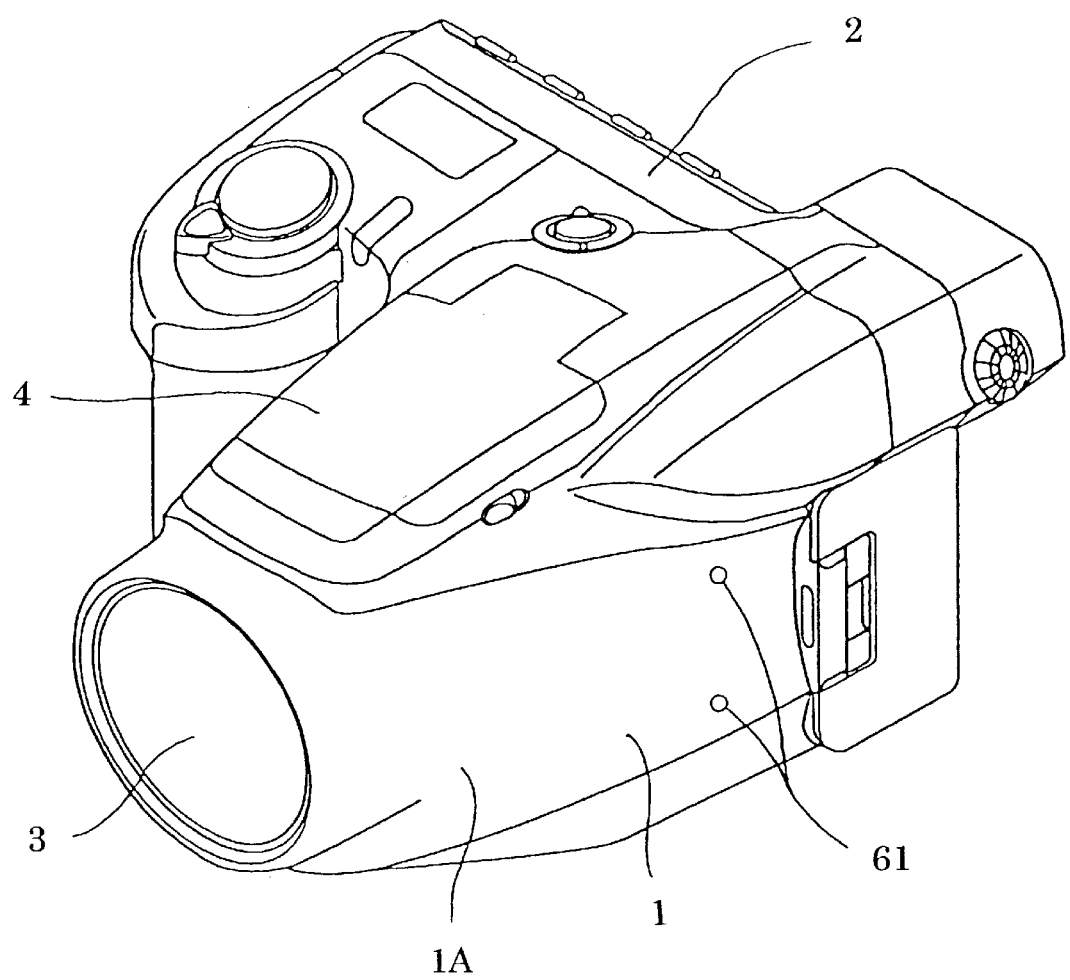
FIG. 1 is a perspective view of an electronic camera viewed from the object side.
Figure 2:
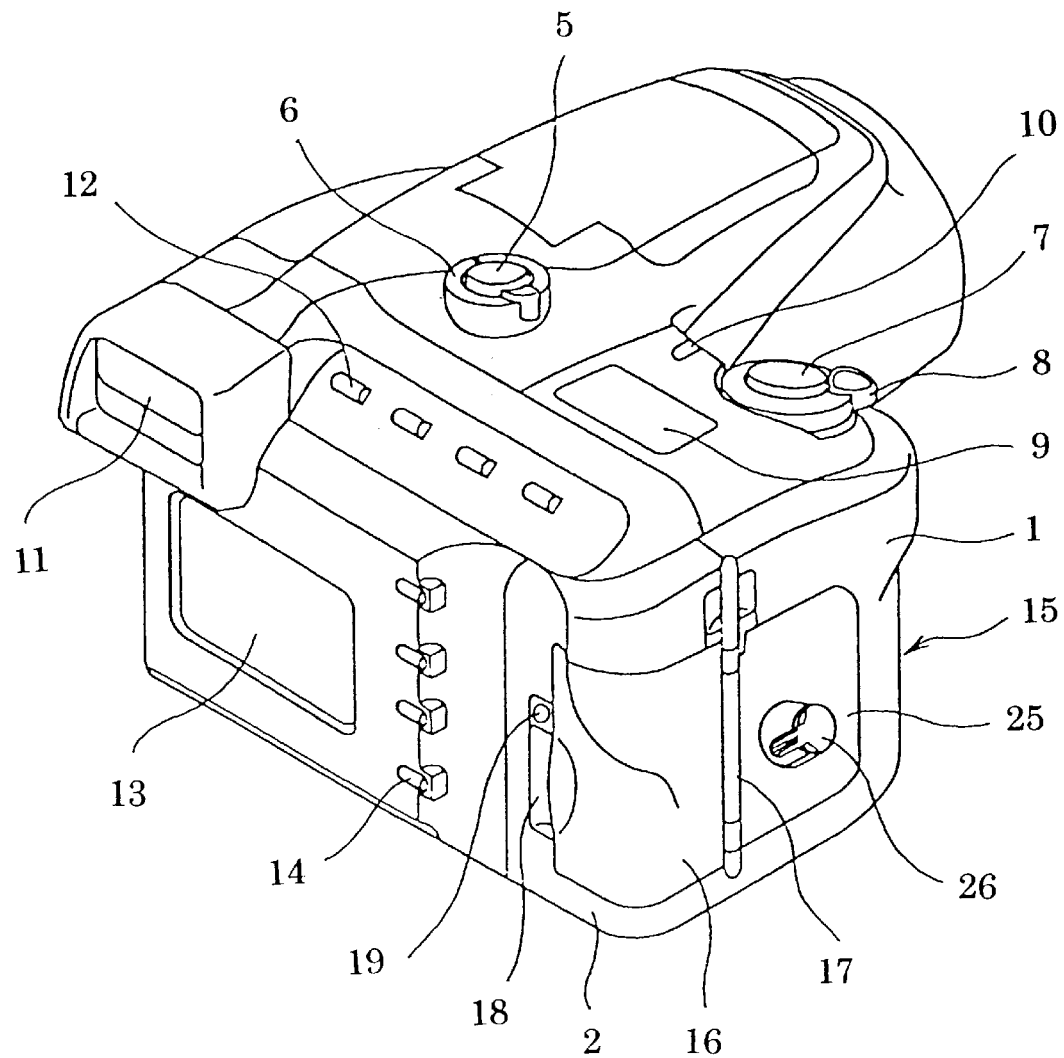
FIG. 2 is a perspective view of an electronic camera viewed from the photographer.
Figure 3:
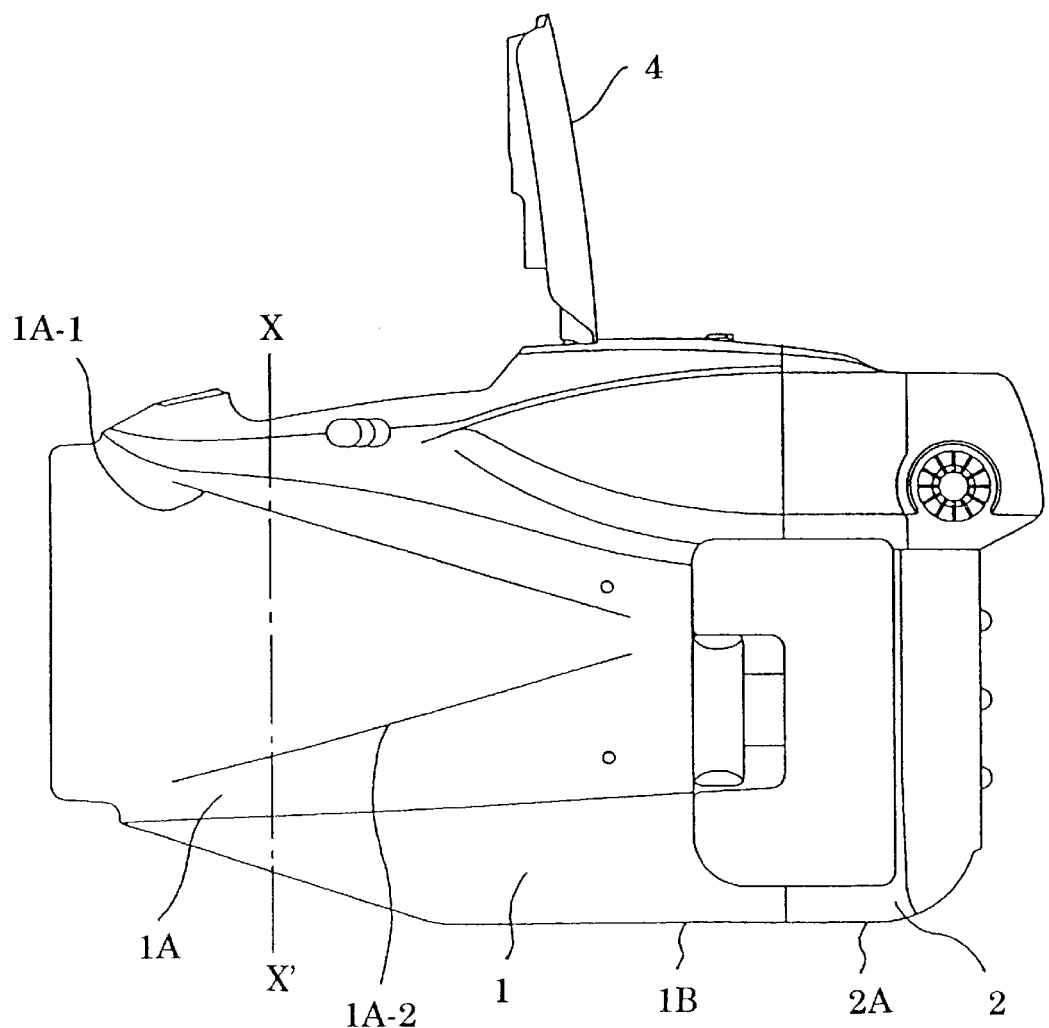
FIG. 3 is a left side view showing the embodiment shown in FIG. 1 in strobo operation state.
Figure 4:
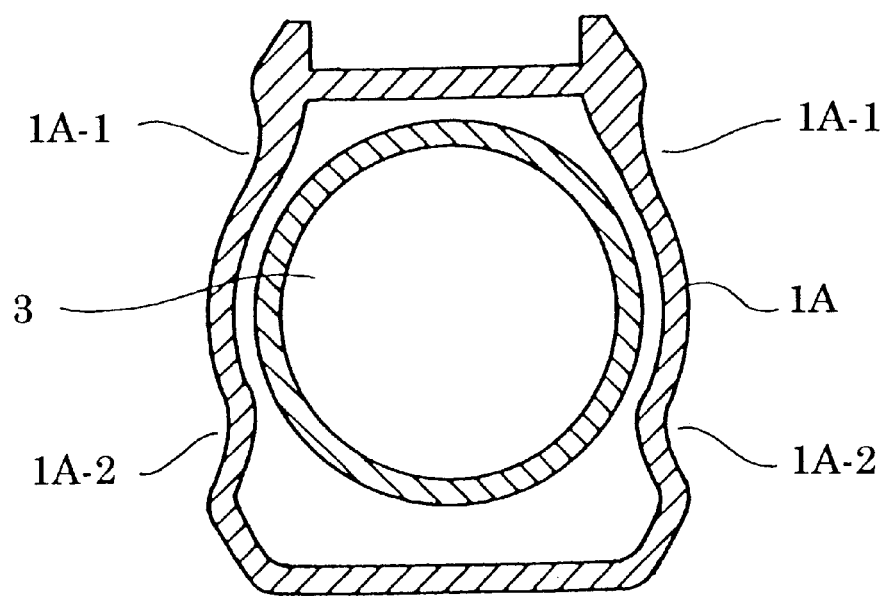
FIG. 4 is a schematic sectional view taken along line X–X' in FIG. 3.

First, parts related to the camera cover will be described, and then the internal camera construction will be described. In his embodiment, the camera body comprises two, i.e., front and rear, cover parts 1 and 2. The front cover part 1 has a substantially cylindrical projection 1A projecting from its front. A photographing lens 3 is provided in the projection, and a pivotally erectable strobo 4 is provided thereon. Referring to FIGS. 1 and 2, the strobo 4 is shown in the out-of-use state. When using the strobo 4, an end portion thereof can be popped up to be substantially vertical, as shown in FIG. 3. Where the cylindrical projection 1A with the photographing lens 3 therein projects from the front cover 1, it is necessary from the gravity relation to hold the projection 1A with a gripping hand (usually left hand). Accordingly, as shown in FIG. 4 which is a schematic sectional view taken along line X–X' in FIG. 3, in this embodiment, the projection 1A has elongate recesses 1A-1 and 1A-2 formed on the opposite sides in correspondence to fingers of the gripping hand holding it such as to be slightly inclined in the longitudinal direction. The bottom of the front cover part 1 has a flat surface 1B, which is flush with the bottom surface 2A of the rear cover part 2. The camera body can be stably held on a support with the flat surfaces as supported surfaces.

A power supply switch button 5 for on-off operating a power supply of the camera is provided on top of the front cover part 1. By depressing the power supply button 5, an internal power supply switch 5-b (see FIG. 12) is operated and, as a result, the power supply is on-off controlled by a system controller 34 (see FIG. 12).

The front body part 1 further has an annular R/P switch 6, provided around the power switch button 5, for being operated by turning. The R/P switch button 6 is operable for switching recording and playback modes, that is, it is turned about the power switch button 5 to operate an internal R/P switch 6-b (see FIG. 12) for controlling the switching of the recording and playback modes. The front body part 1 further has a release button 7 provided on the top adjacent the right end thereof. By depressing the release button 7 in recording, an internal release switch 7-b (see FIG. 12) is turned on to cause recording of an image in a memory card to be described later. The front body part 1 further has a zoom knob 8 which is provided around the release button 7. The zoom knob 8 can be turned about the release button 7. By turning the zoom knob 8 in the clockwise or counterclockwise direction, an internal zoom switch 8-*b* (see FIG. 12) causes interlock control of a zoom focus mechanism 35 (see FIG. 12) in the pick-up lens 3 in a preset direction to enlarge or contract the picked-up image. The top of the cover 1 further has a mode LCD 9 provided near the release button 7. The mode LCD 9 can display the number of recorded frames, the number of possible recording frames, photography mode setting data and so forth. The top of the front body part 1 further has an LED window 10 for a self-timer, provided on the front edge. An internal self-timer LED 10-*b* (see FIG. 12) flickers while the self-timer is in use.

The rear body part 2 has an optical viewfinder piece 11 provided on the top adjacent the left end, for confirming the pick-up image. The rear body part 2 also has four photography mode setting buttons 12 provided in a row on an inclined part of the top on the right side of the optical viewfinder eyepiece 11. The photography mode setting buttons 12 are operable for setting the on-off control of the strobo, forced light emission, contraction factor in recording and shutter speed, and corresponding internal photography mode switches 12-*b* (see FIG. 12) are provided. The rear body part 2 further has an image LCD display (color liquid crystal display) 13 provided on a rear part under the viewfinder eyepiece 11. A recorded image is displayed on the image LCD display 13 so that the picked-up image can be confirmed. The image LCD display 13 can also display attribute data other than the image when recording the image, such as the date and time of recording, frame number and so forth. The rear body part 2 further has four image LCD buttons 14 provided in a vertical row on the right side of the image LCD display 13 and corresponding image LCD switch 14-*b* (see FIG. 12) is provided. These image LCD buttons 14 are operable for setting data to be displayed on the image LCD display 13.

Referring to FIG. 2, a right side part in this embodiment of the electronic camera constitutes a commonly called grip 15 to be gripped with the right hand in usual photography. The grip 15 has a memory card cover lid 16 provided on the front side as viewed from the photographer, i.e., on the right corner of the rear body part 2. The memory card cover lid 16 has one vertical edge hinged to a hinge part 17, which is provided at the juncture of the front and rear body parts 1 and 2. In FIG. 2, the memory card cover lid 16 is shown in the closed state. For opening the closed cover lid 16 with a finger, a recess for inserting a finger therein is provided in a corresponding rear part of the rear body part 2. The rear part of the rear body part 2 further has an LED window 19 provided above the recess 18, and a corresponding internal LED 19-*b* (see FIG. 12) for indicating that the memory card is being accessed is provided.

Figure 5:
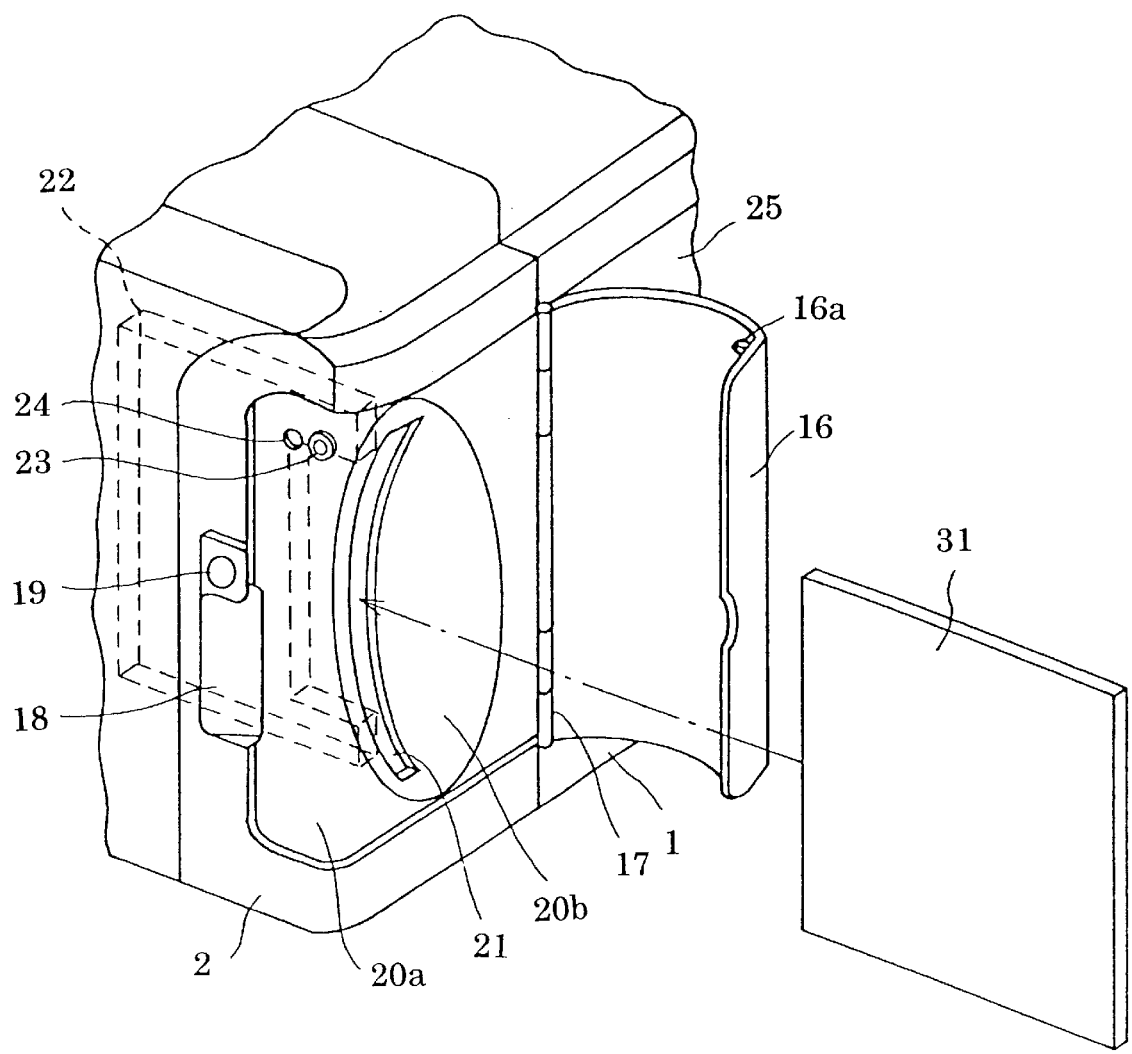
FIG. 5 is a fragmentary perspective view showing the embodiment shown in FIGS. 1 and 2 with a memory card cover lid in the open state.

The memory card cover lid 16 can be opened by turning it with a finger inserted in the recess 18. FIG. 5 shows, partly schematically, the memory card cover lid 16 having been opened. A part of the rear body part 2 corresponding to the memory card cover lid 16 has two main parts, i.e., a flat part 20-*a*, which is on the inner side of the lid and substantially parallel to the rear part of the rear body part 2, and a convex part 20-*b* on the inner side of the lid. The convex part 20-*b* has as lot 21, which is formed in its part near the rear part of the rear body part 2, for inserting the memory card 31 through it. A memory card accommodating part 22 is provided such that it extends parallel to the rear part of the rear body part 2. The memory card 31 is inserted to be in parallel with the rear part of the rear body part 2. Inside the memory card accommodating part 22, a memory card connector 32 (see FIG. 12) is provided for detachably holding the memory card 31. The memory card connector is mounted on an internal circuit board. The memory card insertion slot for inserting the memory card 31 is arcuate in shape, so that it exposes a sufficient central part of the edge of the memory card 31, loaded in the memory card accommodating part 22, for taking hold of the card with fingers.

The flat part 20-*a* noted above has a lid sensor switch 23 and a reset switch 24 provided adjacent to each other near the free edge of the memory card cover lid 16. The lid sensor switch 23 can detect the open and closed states of the memory card cover lid 16. The lid sensor switch 23 detects the closed state of the memory card cover lid 16, when it is depressed by a projection provided on part of the memory card cover lid 16. The power supply is forcibly turned off when the card lid sensor switch 23 detects the opening of the memory card cover lid 16 while the power supply is "on" in either recording or playing state of the electronic camera. Thus, the power source is turned off in response to the open of the memory card lid 16, and when removing the memory card 31 from the memory card accommodating part 22, the power supply is reliably held "off", and the data in the memory card 31 is protected.

Lest the lid sensor switch 23 should be occasionally depressed, the rear cover part has a ridge surrounding the switch 23. The reset switch 24 which is provided near the lid sensor switch 23, can be turned on by depressing it with a pointed member such as the tip of a ball pen. By depressing the reset switch 24, all the set functions of the electronic camera are lost, and the initial state thereof is restored.

Figure 6:
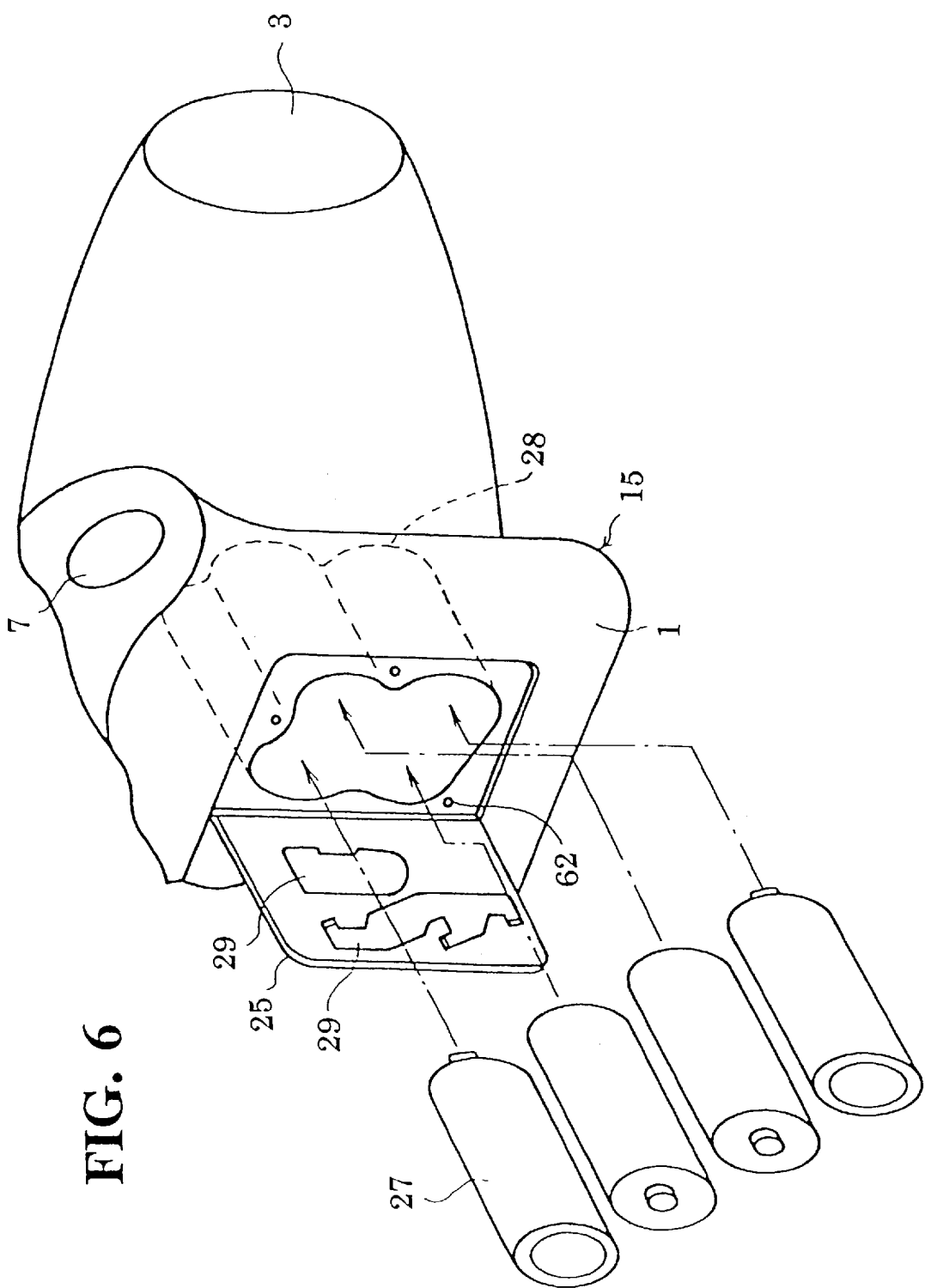
FIG. 6 is a fragmentary exploded perspective view showing the embodiment shown in FIGS. 1 and 2 with a battery cover lid in the open state.

A battery cover lid 16 is provided on a right side part of the front body part 1 constituting the grip 15, such that it is commonly hinged to the hinge member 17 of the memory card cover lid 16. As shown in FIG. 6, a battery accommodating part 28 which can accommodate a plurality of, in this embodiment four, cylindrical battery cells 28, is provided in the cover under the release button 7 and the mode LCD 9 such that all the cylindrical battery cells 27 are inserted horizontally, i.e., in the long dimension direction of the camera body. A battery cover lid 25 has battery connection contacts 29 provided thereon and also serving as a battery cover lid lock member. The battery cells 27 form a power supply, the output of which is converted by an internal DC/DC converter 33 (see FIG. 12) to necessary voltages supplied to various circuit parts. The battery cells 27 are also connected to a strobo control circuit 36 (see FIG. 12) for supplying power to a strobo emission unit 37 (see FIG. 12).

Figure 7:
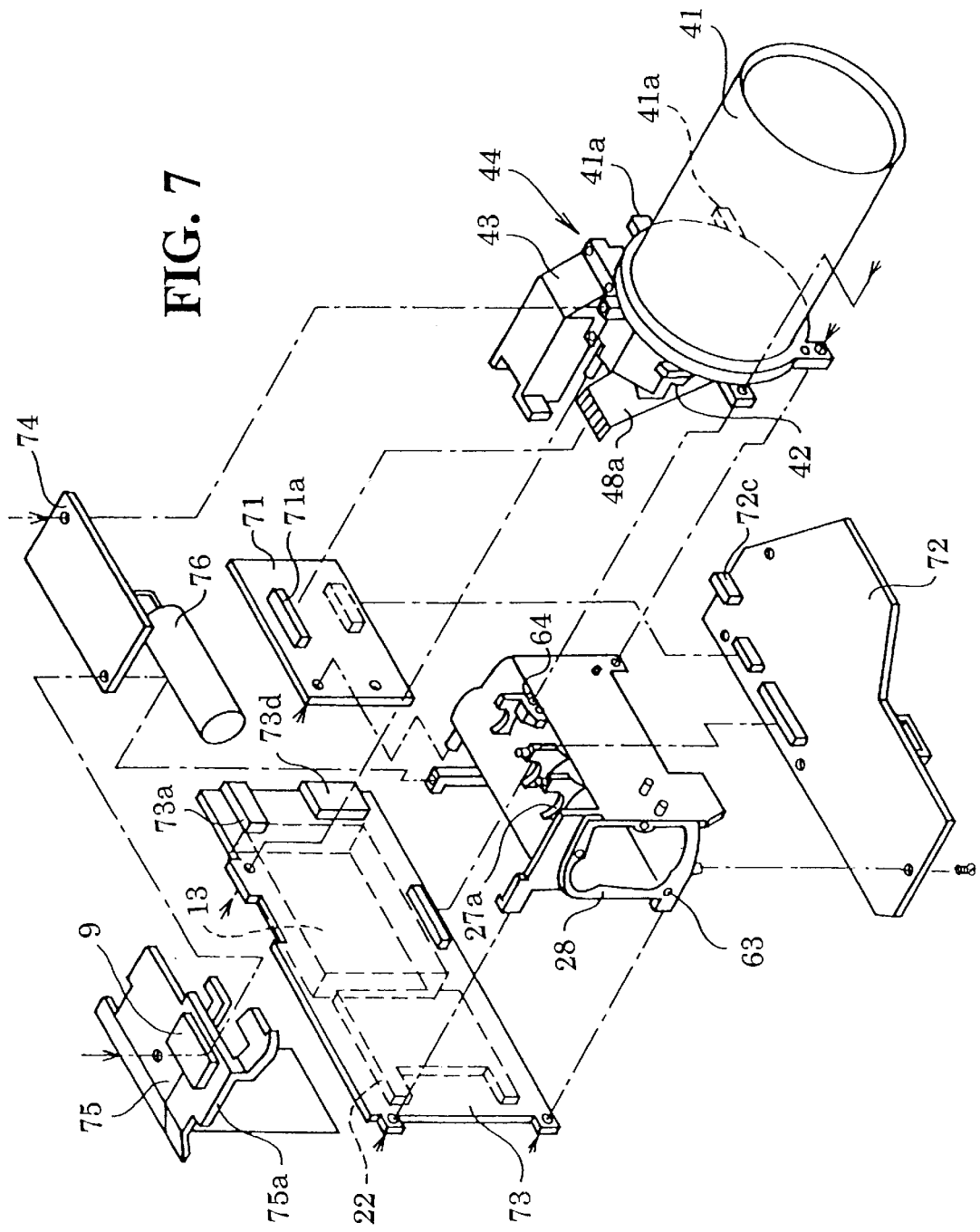
FIG. 7 is an exploded perspective view showing internal components of the embodiment shown in FIGS. 1 and 2.
Figure 8:
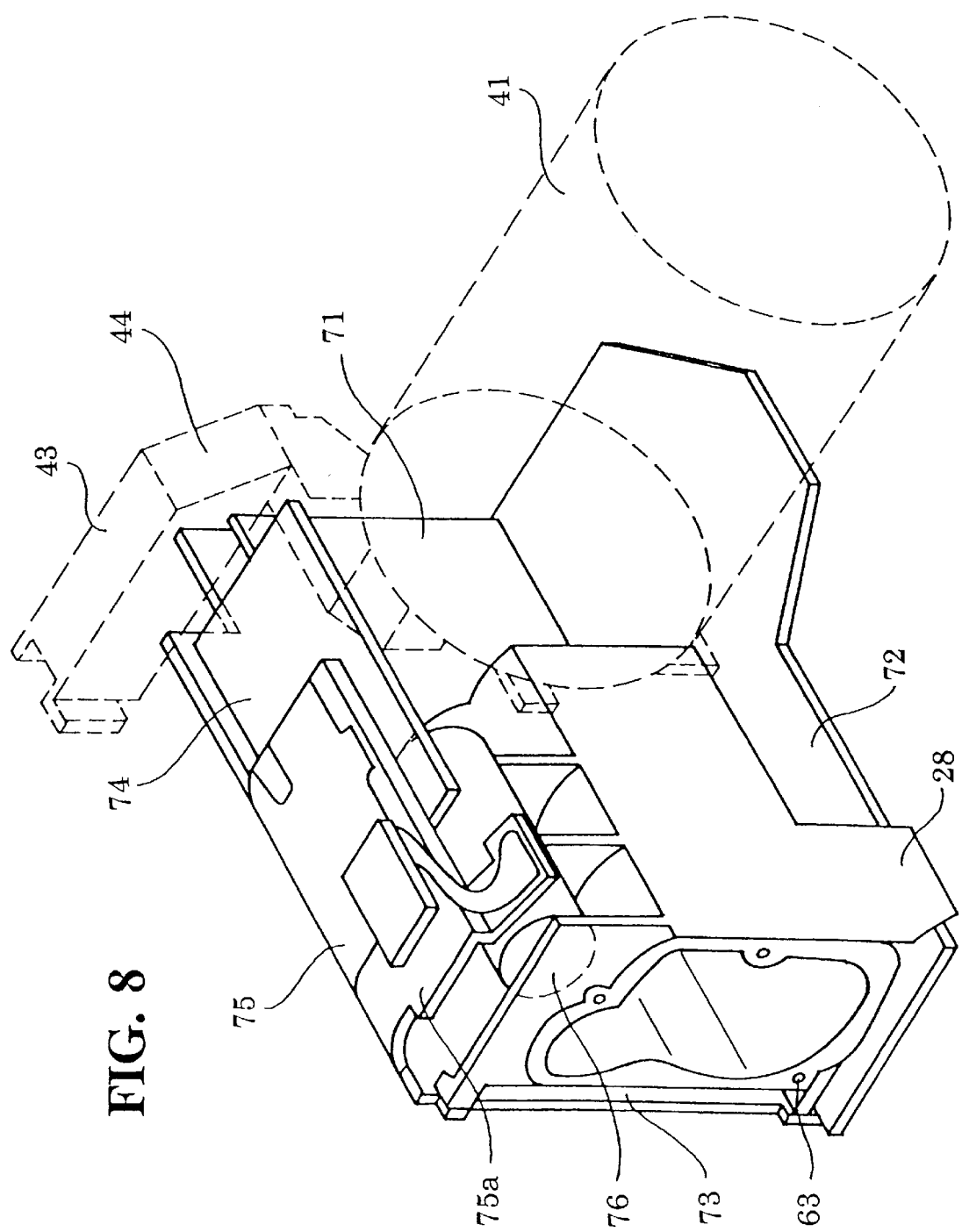
FIG. 8 is an exploded perspective view showing internal components shown in FIG. 7 in a coupled state.

The internal camera mechanism construction will now be described with reference to an exploded perspective view of FIG. 7 and a fragmentary perspective view of FIG. 8. Referring to FIGS. 7 and 8, reference numeral 41 designates a cylindrical member provided in the projection 1A of the front cover part 1A. The cylindrical member 41 accommodates a photographing lens, a lens frame, a lens frame drive motor, a cylindrical cam for moving the lens frame with rotation of the motor and a stop shutter for mechanically adjusting the brightness.

Figure 9:
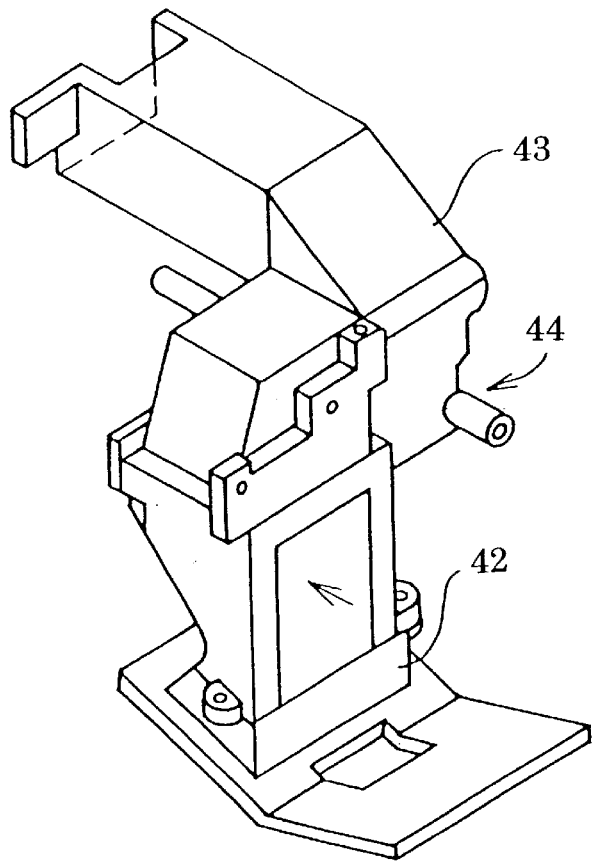
FIG. 9 is a perspective view showing an image pick-up device beam viewfinder assembly shown in FIGS. 7 and 8.
Figure 10:
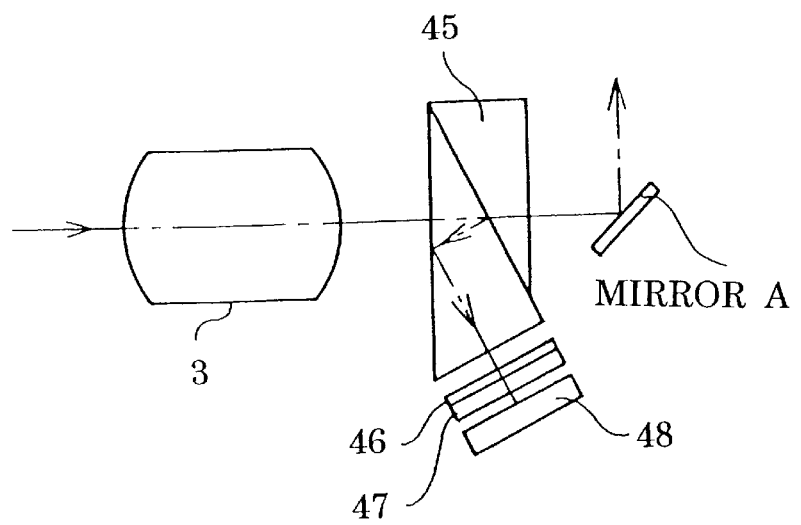
FIG. 10 is a schematic view showing the internal construction of an image pick-up device beam splitter unit in the image pick-up device viewfinder assembly shown in FIG. 9.

Reference numeral 42 designates an image pick-up device beam splitter unit which is secured to the rear end of the cylindrical member 41. A viewfinder unit 43 is screwed to the unit 42. The two units 42 and 43 constitute an image pick-up device.viewfinder assembly 44 as shown in FIG. 9. As shown in FIG. 10, the image pick-up device.beam splitter unit 42 includes a beam splitter 45, a low-pass filter 46, an infrared cut-out filter 47 and an image pick-up device 48. These components are assembled in an exclusive frame to form the unit. The beam splitter 45 splits the light beam having passed through the photographing lens 3 in the cylindrical member 41 into two split slight beams. One of the split light beams is reflected at a juncture interface and then fully reflected at a light incidence surface. The resultant reflected light beam is led through the low-pass filter 46 and the infrared cut-out filter 47 to the image pick-up device 48. The image pick-up device 48, as shown, is disposed such that it is inclined from the optical axis. The other one of the split light beams from the beam splitter 45, is led to an optical viewfinder unit 43 as described below.

Figure 11:
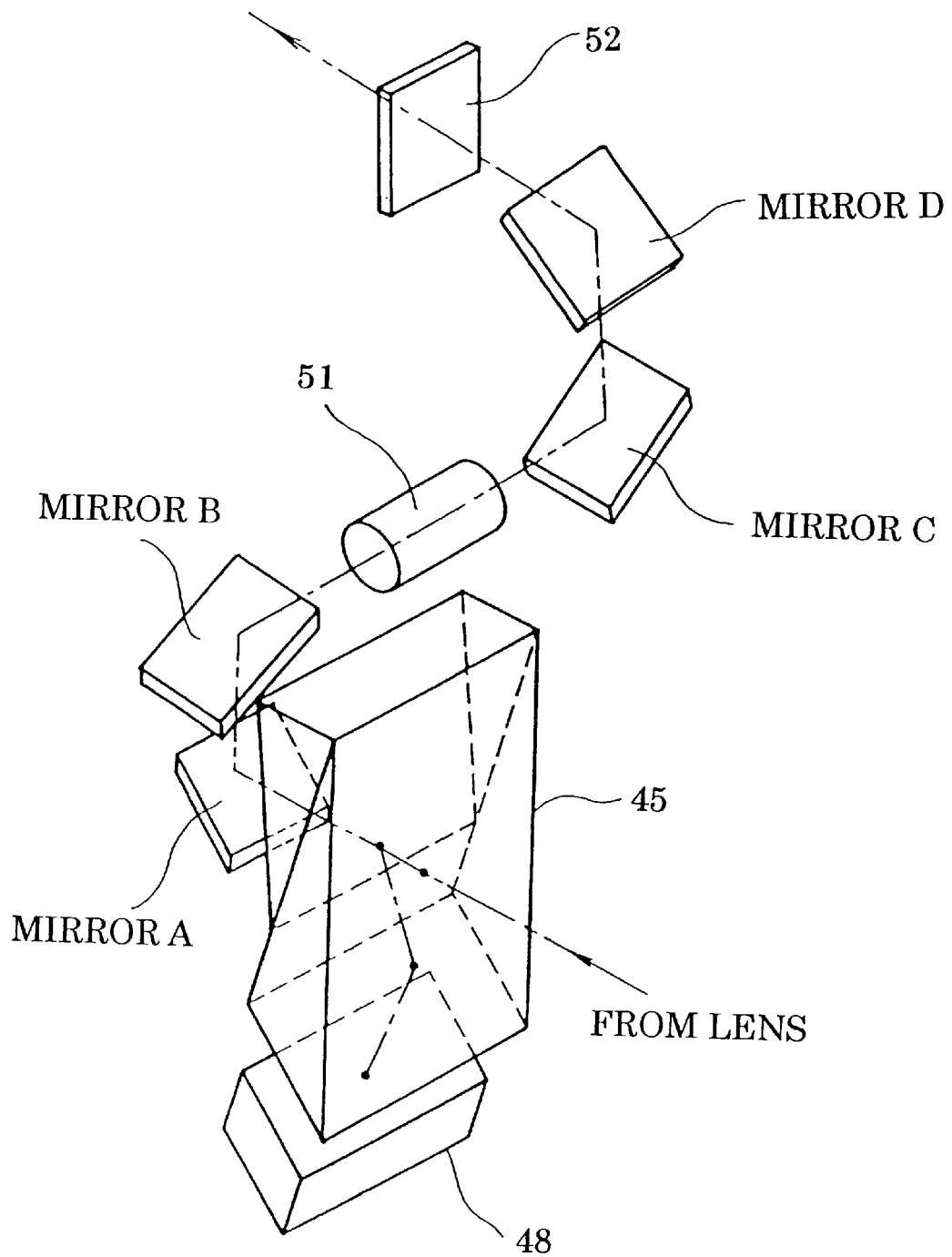
FIG. 11 is a schematic view showing the internal construction of the image pick-up device viewfinder assembly shown in FIG. 9.

As shown in FIG. 11, the optical viewfinder unit 43 includes mirrors A and B, a relay lens 51, mirrors C and D and an eyepiece lens 52. These components are held in a viewfinder case to form the optical viewfinder unit 43.

The optical path in the optical viewfinder unit 43 will now be briefly described. The light beam passed through the beam splitter 45 and emitted from the light emission surface thereof, is reflected right upward by the mirror A, and is then reflected to the right (i.e., to the left when viewed from the photographer) by the mirror B. Although not shown, a condenser lens and a sight field frame member having a viewfinder observation surface defining a photographing range, are disposed between the mirrors A and B. The light beam reflected by the mirror B is passed through the relay lens 51, then reflected right upward by the mirrors C and D, and then passed through the eyepiece lens 52 to be incident on the viewfinder eyepiece 11. As shown above, the photographing optical axis which is provided near the camera body center, is led by the combination of mirrors up to the viewfinder eyepiece 11, which is provided on top of the camera body adjacent to the left end thereof in the view from the photographer.

As described above, the image pick-up device.beam splitter 42 constitutes together with the viewfinder unit 43 the image pick-up device viewfinder assembly 44. The image pick-up device.viewfinder assembly 44 is screwed to the rear end of the cylindrical member 41, thus forming an optical unit. The battery accommodating part is assembled to the optical unit, thus forming a hybrid camera frame. Various electric circuit boards are assembled to the hybrid camera frame, thus forming an integral internal mechanism. The internal mechanism thus formed is secured to the cover by screwing it to the front cover part. The internal mechanism is screwed to the front cover part by screwing screws, which are inserted through screw insertion holes 61 (see FIG. 1) provided in a side wall of the projection 1A of the front cover part 1, into screw securing parts 41a provided on the cylindrical member 41, screwing screws, which are inserted through screw insertion holes 62 (see FIG. 6) provided in the front cover part 1 near a battery insertion opening thereof, into threaded holes 63 formed in the battery accommodating part 28 near a battery insertion opening thereof, and inserting screws, which are inserted through screw insertion holes (not shown) formed in the front cover part 1 at position thereof intermediate between the front of the grip and the projection 1A, through part of the cylindrical member 41 into screw securing part 64 provided on the battery accommodating part 28.

Now, various electric circuit boards which are assembled to the hybrid camera frame which has been formed by making the cylindrical member 41, the image pick-up device viewfinder assembly 44 and the battery accommodating part 28 with one another, will be described. As showing in FIGS. 7 and 8, the assembled electric circuit boards include five main boards, i.e., a photographing board 71, a main board 72, a power supply I/F board 73, a strobo board 74 and a switch FPC (flexible electric circuit board) 75. These boards will now be briefly described in connection with their dispositions, status of connection to other boards and main functions.

The photographing board 71 is rectangular in shape, and is disposed behind the image pick-up device beam splitter unit 42 such that it is parallel to the rear surface of the camera body with its long dimension direction parallel to the bottom of the camera body. The photographing board 71 is connected via an image pick-up device FPC 48a to the image pick-up device 48 and via a board-to-board connector to the main board 72. To prevent deterioration of signal by noise, the image pick-up device FPC 48a which is directly mounted on the image pick-up device 48 disposed slantedly in the image pick-up device beam splitter unit 42, is connected via a spot path to an FPC connector 71a on the photographing board 71. The photographing board 71 is mainly constituted by an image processor 71b (see FIG. 12) for processing image signal, which is obtained as a result of photoelectric conversion of signal in the image pick-up device 48.

The main substrate 72 has a rectangular shape with trapezoidal extension, and is disposed to be parallel to the bottom of the camera body such that the trapezoidal extension is found underneath the cylindrical member 41. The main board 72 is connected to the photographing board 71, the power supply I/F board 73, the strobo board 74, the switch FPC 75 and the cylindrical member 41. The main board 72 is also connected via a board-to-board (B/B) connector to the power supply I/F board 73, via an FPC connector to the switch FPC 75, via a lens FPC (not shown) to the cylindrical member 41 and via the switch FPC 75 to the strobo board 74.

On the main board 72 are mounted a digital processor 72a (see FIG. 12) for performing the digital processing, such as compression and decompression or coding, of the image signal from an image signal processing circuit 71b, a buffer memory 72b (see FIG. 12) as recording means for tentatively recording the data in the memory card, and a system controller 34 (see FIG. 12) for performing control of the entire system, including mechanical control of the cylindrical member system. A digital output jack 72c for the personal computer is provided to the main board 72 such that its lower portion is placed below the opposite side surface of the grip (portion to be gripped).

The power supply IF board 73 is rectangular in shape, and is disposed right behind the rear wall of the camera body with its long dimension direction parallel to the bottom of the camera body. As described before, the power supply I/F board 73 is connected via a B/B connector to the main board 72 and via lead lines to battery electrodes of the battery accommodating part 28. On the power supply I/F board 73 are mounted a DC/DC converter 33 (see FIG. 12) for converting the battery voltage to exclusive voltages for individual boards, a jack 73a for external power supply, interfaces 73b and 73c (see FIG. 12) for outputting digital image signals to external personal computer and printer, a jack 73d for the printer and the memory card accommodating part 22, which accommodates the memory card as a recording medium for recording image signal therein and has a memory card connector.

The memory card accommodating part 22 with the memory card connector, is mounted on the rear surface of the power supply I/F board 73 with its card insertion opening directed toward one side (i.e., grip) of the camera body. The LCD display 13 is mounted also on the rear of the camera body adjacent the memory card accommodating part 22. The DC/DC converter 33 is mounted on a small rectangular exclusive board (not shown), which is mounted on the surface of the side of the battery accommodating part and substantially right behind the memory card accommodating part 22.

The strobo board 74 is rectangular in shape, and is mounted to be parallel with the bottom of the camera body with its long dimension direction parallel to the rear surface of the camera body. The strobo board 74 is connected via lead lines to the pop-up type strobo 4, which is provided on top of the projection 1A of the front cover part, via lead lines to the power supply I/F board 73 and via the switch FPC 75 to the main board 72. On the strobo board 74, mainly a strobo controller (see FIG. 12) for driving a xenon tube in the pop-up strobo 4 and a main capacitor 76 are mounted.

The switch FPC 75 comprises a flexible printed circuit board. A portion of the board parallel to the top of the camera body covers the upper surface of the strobo board 74. A portion of the board parallel to the rear wall of the camera body covers the upper surface of the memory card accommodating part 22 mounted on the power supply I/F board 73. The switch FPC 75 further has an FPC retainer part 75a in correspondence to the portion parallel to the top of the camera body and a bent corner. On the switch FPC 75, a self-timer, a display LED for alarming photographing, a mode display LCD 9, various switches, a pattern thereof and a microcomputer are mounted. As described above, the switch FPC 75 is connected by the FPC connector to the main board 72.

The above various boards are mounted on the hybrid camera frame such that they are disposed between the hybrid camera frame and the front and rear cover parts. These boards are mounted on the hybrid camera frame as follows. The photographing board 71 are screwed by two screws to the battery accommodating part 28 and the image pick-up device.viewfinder assembly 44 from the behind thereof. The main board 72 is screwed by three screws to the battery accommodating part 28 and to part of the image LCD display 13 mounted on the power supply I/F board 73 from the bottom side of thereof. The power supply I/F board 73 is screwed by three screws to the battery accommodating part 28 and to the image pick-up device viewfinder assembly 44 from behind thereof. The strobo board 74 is screwed by two screwed to the battery accommodating part 28 and to the image pick-up device viewfinder assembly 44 from the top side of these components. The main capacitor 76 is cylindrical in shape, and is mounted on the strobo board 74 by bending lead lines at right angles such that it extends parallel to the strobo substrate. A major portion of the main capacitor 76 projects from the edge of the strobo board 74 toward the battery accommodating part 28. The main capacitor 76 is held stably such that its projecting portion is received in a recess 27a, formed in an outer wall of the battery accommodating part 28 and having a curved surface complementary to its cylindrical outer shape, and pushed from above by part of the FPC retainer part 75a.

The switch FPC 75 is applied by double-side adhesive tape to the FPC retainer part 75a and also to the memory card accommodating part 22 mounted on the power supply I/F substrate 73 and having the memory card connector. A portion of the switch FPC 75, on which the LED for photographing alarming is mounted, is applied to a support surface adjacent to one side of the eyepiece of the viewfinder unit 43.

Figure 12:
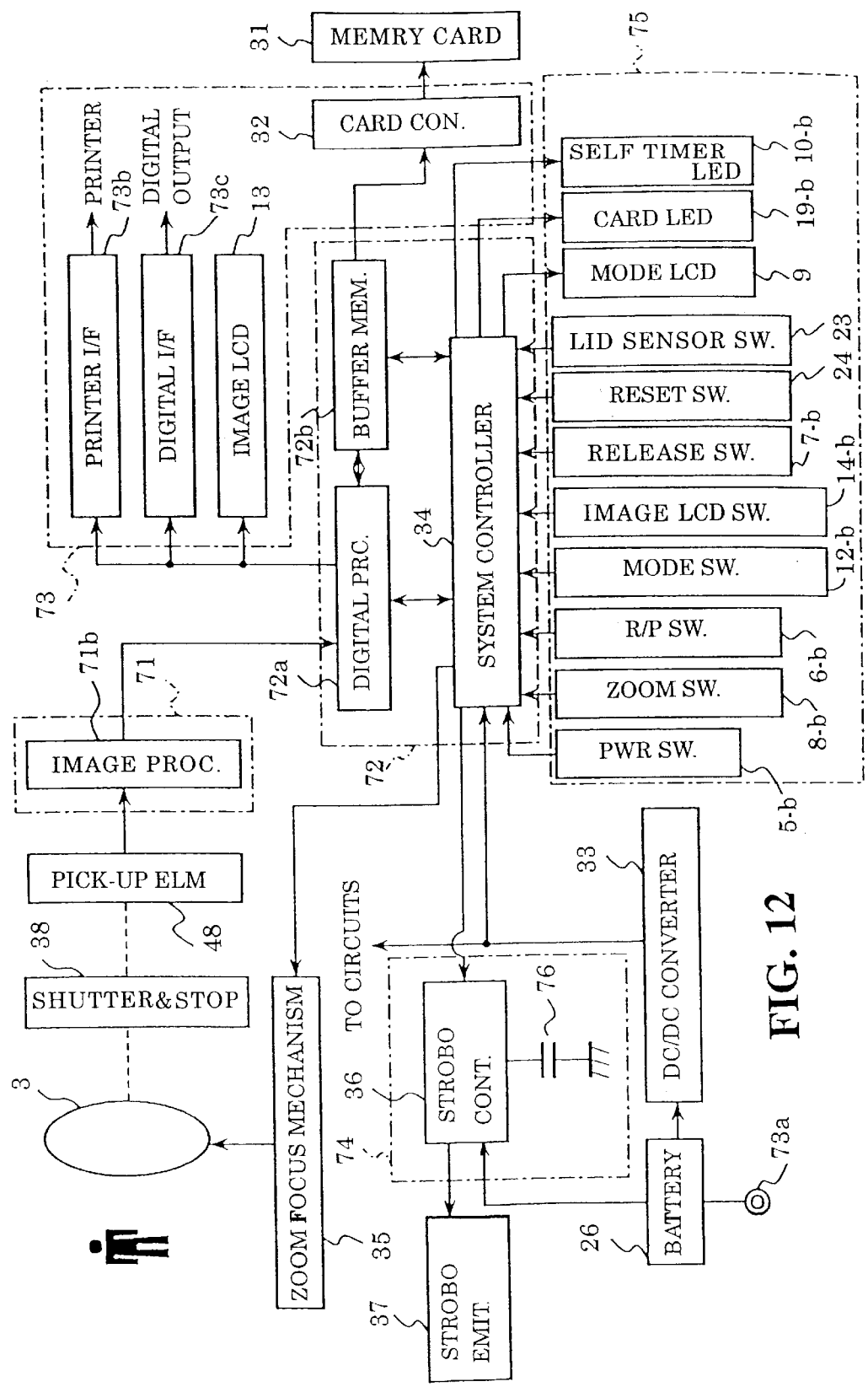
FIG. 12 is a block diagram showing the electric circuit construction of the embodiment of the present invention.

A summary of the operation of the electronic camera having the above construction, will now be described mainly with reference to FIG. 12. In recording, when the release button 7 is turned on, an image is coupled through the imaging lens 3, which is focus zoom controlled by the zoom focus mechanism 35, the mechanical shutter and the stop 38 to the image pick-up element 48 for conversion to an electric signal. The electric signal from the image pick-up device 48 is processed in the image processor 71b, then converted in the digital processor 72a to a digital signal, and then image data is recorded in the memory card 31 with the internal memory as buffer memory 72b. In playing-back, the image data in the memory card 31 is converted in the digital processor 72a for play-back display on the image LCD display 13, or the digital signal may be supplied via the digital interface 73c to the external personal computer or the like or via the printer interface 73b to the printer.

In the above embodiment the projection 1A of the front cover part 1 has recesses formed on the opposite sides. However, by forming recesses only on one side of the projection 1A, it is possible to permit properly gripping the camera with the gripping hand. In addition, while in the above embodiment the internal mechanism obtained by various electric circuit boards to the hybrid camera frame was secured to the sole front cover part, it is also possible to secure the internal mechanism to the rear cover part. In general, by securing the internal mechanism to either the front or the rear cover part, it is possible to prevent generation of stress in the hybrid camera frame or the like.

As has been described in the foregoing, according to the first aspect of the present invention, with the optical viewfinder eyepiece disposed on an upper part of the rear surface of the camera body adjacent the left end thereof, the optical path of the viewfinder is bent to the left end at an intermediate position, and the upper space in the camera body is not divided by the optical viewfinder. It is thus possible to effectively utilize the upper space. In addition, it is possible to reduce the depth or thickness of the camera body.

According to the second aspect of the present invention, it is possible to realize an electronic camera, which comprises a strobo light emission part adapted such that strobo light is not blocked by any camera part and that the dead space can be effectively utilized.

According to the third aspect of the present invention, it is possible to provide an electronic camera, which can be stably supported by utilizing the bottom of the camera body, and permits effective utilization of the space in the camera body adjacent the bottom thereof.

According to the fourth aspect of the present invention, it is possible to provide an electronic camera, which can be held stably in photographing, and permits effectively preventing its swinging.

According to the fifth aspect of the present invention, with the image pick-up surface of the image pick-up device disposed at an angle other than right angles to the optical axis of the photographing lens, it is possible to reduce the depth or thickness of the camera body.

According to the sixth aspect of the present invention, in an electronic camera accommodating a main capacitor for strobo, it is possible to reduce the camera height.

According to the seventh aspect of the present invention, the main capacitor may be effectively in space and stably held.

According to the eighth aspect of the present invention, a hybrid camera frame is formed by coupling together internal components to dispense with any exclusive frame. It is thus possible to reduce cost and save space.

According to the ninth aspect of the present invention, an electric circuit board is disposed between the hybrid camera frame and the inner cover surface. It is thus possible to improve the board mounting efficiency.

According to the tenth aspect of the invention, the hybrid camera frame is secured to only a single one of a plurality of cover parts. It is thus possible to prevent strain generation in the frame.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An electronic camera comprising:
   the image pick-up device constructed and arranged to convert an image obtained via a photographing optical system to an electric signal,
   an electronic flash and a camera body accommodating a plurality of battery cells as camera power supply disposed to be substantially parallel to the rear and bottom surface of the camera body, an elongate main capacitor for the electronic flash being disposed along an outer wall of a battery accommodating part for accommodating the plurality of battery cells therein; and
   wherein the battery accommodating part forms at least a part of an inner framework of the electronic camera, the inner framework supports predetermined members constructing the electronic camera in cooperation; and
   wherein the battery accommodating part is formed such that the elongate main capacitor is held in a recessed member configured to a curved surface of the elongate main capacitor complementary of an outer cylindrical shape thereof, provided on a predetermined portion of the outer wall of the battery accommodating part.

2. An electronic camera according to claim 1, further comprising:
   a beam splitter constructed and arranged to split a light beam having passed through the image pick-up device into a plurality of split light beams,
   the image pick-up device constructed and arranged to convert one of the split light beams emitted from the beam splitter to the electric signal, and
   an optical viewfinder adapted to use another one of the split light beams emitted from the beam splitter for visually recognizing the image, the eyepiece of the optical viewfinder being disposed on an upper part of the rear surface of the camera body adjacent the left end of the camera body.

3. An electronic camera according to claim 1, further comprising:
   a beam splitter constructed and arranged to split a light beam having passed through the image pick-up device into a plurality of split light beams,
   the image pick-up device constructed and arranged to convert one of the split light beams emitted from the beam splitter to the electric signal, and
   an optical viewfinder adapted to use another one of the split light beams emitted from the beam splitter for visually recognizing the image, wherein the image pick-up device has an image pick-up surface at an angle other than right angles to the optical axis of the photographing optical.

4. An electronic camera according to claim 1,
   wherein the inner framework comprises the battery accommodating part and an assembly for accommodating an electronic view finder.

5. An electronic camera according to claim 1,
   wherein the battery accommodating part is provided such that a circuit board for the electronic flash is fastened thereto.

6. An electronic camera according to claim 1,
   wherein the battery accommodating part is provided such that a circuit board for a DC/DC converter is mounted thereon.

* * * * *